United States Patent
Ehmann et al.

(10) Patent No.: US 7,085,950 B2
(45) Date of Patent: Aug. 1, 2006

(54) PARALLEL DATA COMMUNICATION REALIGNMENT OF DATA SENT IN MULTIPLE GROUPS

(75) Inventors: Gregory E. Ehmann, Sleepy Hollow, IL (US); D. C. Sessions, Phoenix, AZ (US); Timothy Pontius, Lake in the Hills, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 592 days.

(21) Appl. No.: 09/966,297

(22) Filed: Sep. 28, 2001

(65) Prior Publication Data

US 2003/0065987 A1 Apr. 3, 2003

(51) Int. Cl.
*G06F 13/14* (2006.01)
*G06F 1/24* (2006.01)

(52) U.S. Cl. .................. 713/503; 713/400; 709/232; 709/238; 709/248; 370/441; 370/503

(58) Field of Classification Search ............... 713/400, 713/503; 709/232, 238, 248; 370/441, 503
See application file for complete search history.

(56) References Cited

U.S. PATENT DOCUMENTS 5,799,175 A    8/1998  Cassiday et al.
5,920,704 A  *  7/1999  Olnowich et al. ........... 709/238
6,536,025 B1 *  3/2003  Kennedy et al. ................ 716/6
6,647,027 B1 * 11/2003  Gasparik et al. ............ 370/519
6,697,974 B1 *  2/2004  Craft .......................... 714/700
6,735,397 B1 *  5/2004  Herrity ....................... 398/158

OTHER PUBLICATIONS

1990–245433/TP79010, Jul. 1990, Derwent.*

* cited by examiner

*Primary Examiner*—Rehana Perveen
(74) *Attorney, Agent, or Firm*—Michael J. Ure

(57) ABSTRACT

A high-speed parallel data communication approach overcomes data skewing concerns by concurrently transmitting data in a plurality of multiple-bit groups and, after receiving the concurrently-transmitted data, realigning skew-caused misalignments between the groups. In one particular example embodiment, for each group, an arrangement transfers the data in parallel and along with a clock signal for synchronizing digital data. The transferred digital data is synchronously collected via the clock signal for the group. At the receiving module, the data collected for each group is aligned using each group's dedicated clock signal. Skew across clock-domain groups is tolerated and overcome by processing the data and the skew first within each clock domain group, and then between groups.

31 Claims, 6 Drawing Sheets

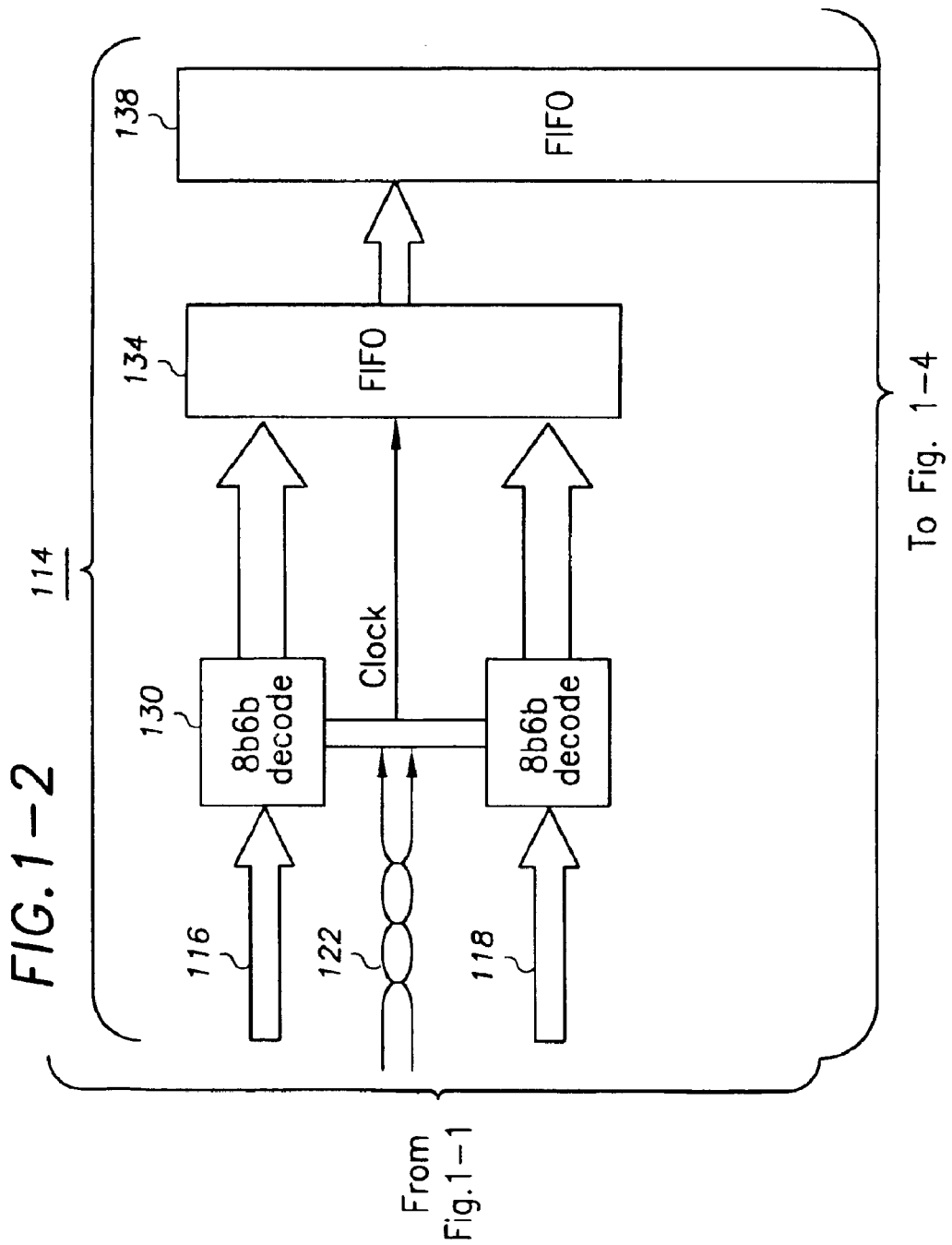

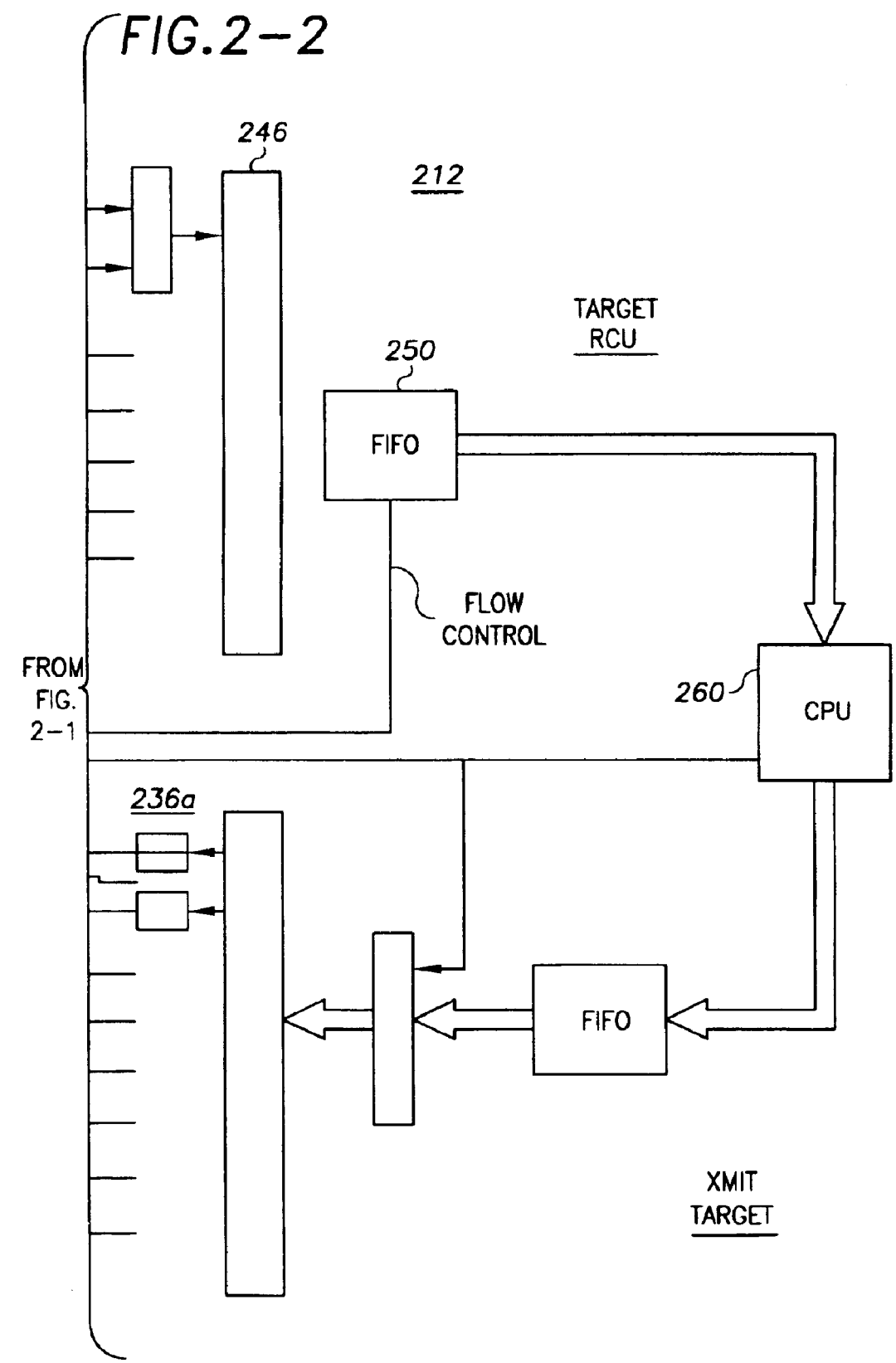

_US 7,085,950 B2_

PARALLEL DATA COMMUNICATION REALIGNMENT OF DATA SENT IN MULTIPLE GROUPS

RELATED PATENT DOCUMENTS

The present invention is related to and fully incorporates the subject matter disclosed in U.S. patent applications, Ser. No. 09/871,197, entitled "Parallel Communication Based On Balanced Data-Bit Encoding" (VLSI.295PA); Ser. No. 09/871,160 entitled "Parallel Data Communication Consuming Low Power" (VLSI.299PA); Ser. No. 09/871,159, entitled "Parallel Data Communication Having Skew Intolerant Data Groups" (VLSI.300PA); and Ser. No. 09/871,117, entitled "Parallel Data Communication Having Multiple Sync Codes" (VLSI.312PA).

FIELD OF THE INVENTION

The present invention is directed generally to data communication. More particularly, the present invention relates to methods and arrangements for reducing skew errors in data signals transmitted on parallel data bus lines.

BACKGROUND OF THE INVENTION

The electronics industry continues to strive for high-powered, high-functioning circuits. Significant achievements in this regard have been realized through the development of very large-scale integrated circuits. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces that are designed to ensure that data integrity is maintained while using circuit designs are sensitive to practicable limitations in terms of implementation space and available operating power.

The increased demand for high-powered, high-functioning semiconductor devices has lead to an ever-increasing demand for increasing the speed at which data is passed between the circuit blocks. Many of these high-speed communication applications can be implemented using parallel data transmission in which multiple data bits are simultaneously sent across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel), for example, in the form of a cable, a backplane circuit, a bus structure internal to a chip, other interconnect, or any combination of such communication media. A sending module transmits data over the bus synchronously with a clock on the sending module. In this manner, the transitions on the parallel signal lines leave the sending module in a synchronous relationship with each other and/or to a clock on the sending module. At the other end of the parallel data interconnect, the receiving module receives the data on the parallel data bus; where the communication arrangement passes a clock signal, the receive clock is typically derived from or is synchronous with the clock on the sending module. The rate at which the data is passed over the parallel signal lines is sometimes referred to as the (parallel) "bus rate."

In such systems, it is beneficial to ensure that the received signals (and where applicable, the receive clock) has a specific phase relationship to the transmit clock to provide proper data recovery. There is often an anticipated amount of time "skew" between the transmitted data signals themselves and between the data signals and the receive clock at the destination. There are many sources of skew including, for example, transmission delays introduced by the capacitive and inductive loading of the signal lines of the parallel interconnect, variations in the I/O (input/output) driver source, intersymbol interference and variations in the transmission lines' impedance and length. Regardless of which phenomena cause the skew, achieving communication with proper data recovery, for many applications, should take this issue into account.

For parallel interconnects serving higher-speed applications, in connection herewith it has been discovered that skew is "pattern dependent" and that the severity of this issue can be mitigated and, in many instances, largely overcome. As described in the above-referenced patent document entitled "Parallel Communication Based On Balanced Data-Bit Encoding" (VLSI.295PA), this pattern dependency results from the imperfect current sources shared between the data bits in the parallel bus. The shared current sources induce skew at the driver, which directly reduces margin at the receiver, which in turn can cause data transmission errors.

Many of these high-speed parallel communication applications require the parallel transmission of many bits of data and, therefore require the use of a corresponding number of parallel-bus data lines. Typically, the greater the number of data bits (or parallel-bus data lines), the more difficult it is to prevent unacceptable levels of skew across all the bits. With increasing transmission rates, this difficulty is a bottleneck to the number of useful parallel-bus data lines.

Accordingly, there is a need to improve data communication over parallel busses, which would lead to more practicable and higher-speed parallel bussing of data which, in turn, would permit higher-powered, higher-functioning circuits that preserve data integrity and are sensitive to such needs as reducing implementation space and power consumption.

SUMMARY OF THE INVENTION

Various aspects of the present invention are directed to data transfer over parallel-communication line circuits in a manner that addresses and overcomes the above-mentioned issues and can be used in conjunction with the embodiments disclosed in the above-mentioned patent documents.

Consistent with one example embodiment, the present invention is directed to a high-speed parallel data communication approach that overcomes data skewing concerns by concurrently transmitting data in a plurality of multiple-bit groups and, after receiving the concurrently-transmitted data, realigning skew-caused misalignments between the groups.

In another particular example embodiment, for each group, a high-speed parallel data communication arrangement transfers the data in parallel and along with a clock signal for synchronizing digital data. The transferred digital data is synchronously collected via the clock signal for the group. At the receiving module, the data collected for each group is aligned using each groups dedicated clock signal. Skew across clock-domain groups is tolerated and overcome by processing the data and the skew first within each clock domain group, and then between groups.

In applications involving a high-speed data transfer over a parallel data circuit, various example embodiment of the present invention are directed to tolerating data skew across a relatively large number of parallel bus lines by grouping the bus lines into individual clock domains and permitting only a small degree of data skew within each clock domain. Using FIFO buffers to collect the data collected from each group, the collected FIFO data is then stored in a global-group FIFO buffer and then aligned from group to group to recreate the data originally sent over the bus. The approach overcomes more significant skew-caused misalignments between data concurrently transferred in different groups.

Other example embodiments of the present invention are respectively directed to various other related aspects including coding and decoding and system-processing aspects of such communication.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
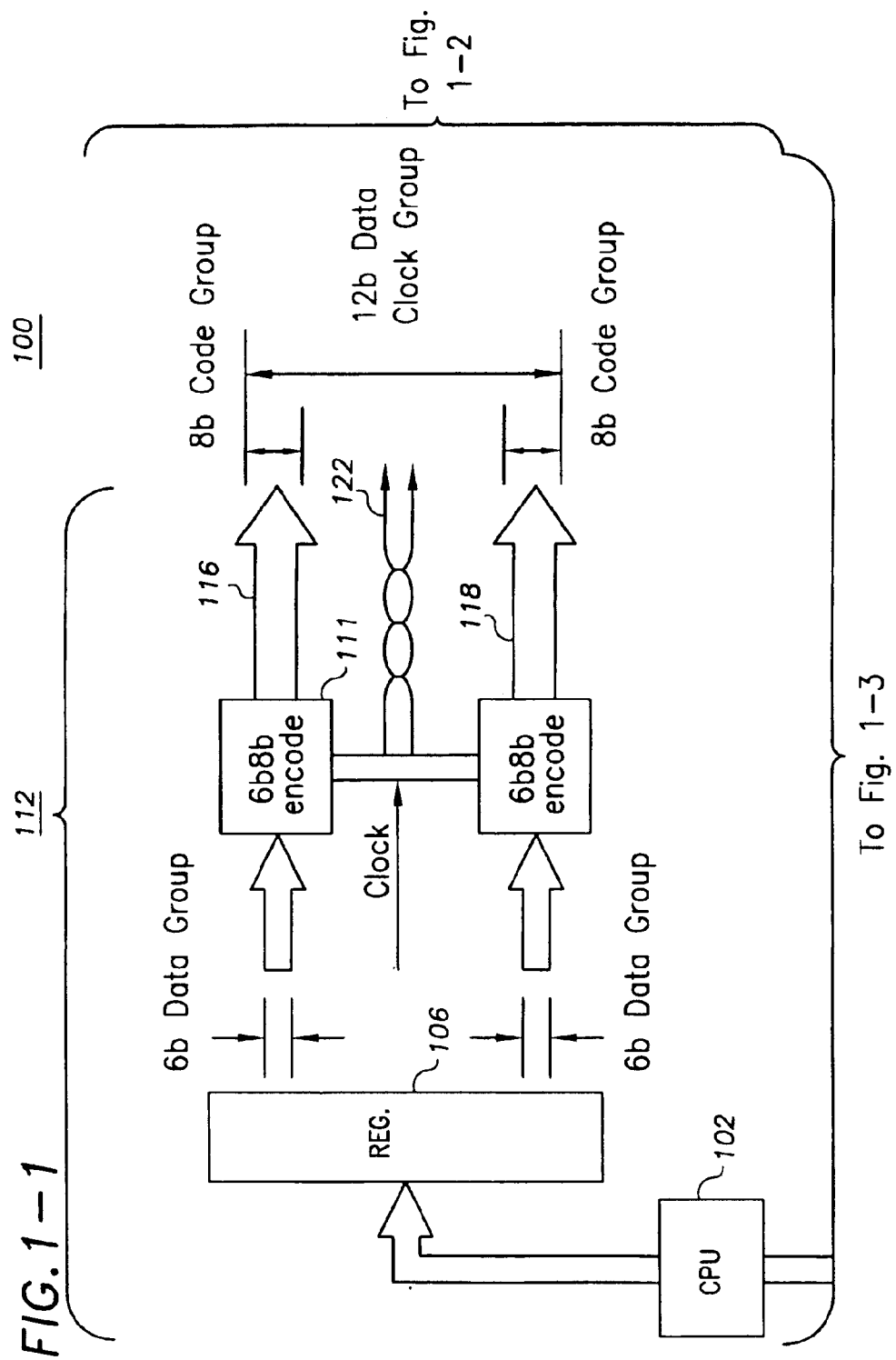
FIG. 1 is a diagram of an example parallel data communication arrangement in which digital data is transferred in parallel from a first module to a second module over a communication channel including a plurality of parallel data-carrying lines, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EXAMPLE EMBODIMENTS

The present invention is believed to be generally applicable to methods and arrangements for transferring data between two modules (functional blocks) intercoupled by a parallel data communication path. The invention has been found to be particularly advantageous for high-speed data transfer applications susceptible to data-skew errors. Examples of such applications include, among others: SSTL (stub series transceiver/terminated logic); RSL (Rambus Signaling Logic) interfaces; closely-connected applications such as where the parallel data communication path intercouples the two modules on a single-chip; and off-board high-speed communication between chips typically situated immediately adjacent each other on the same printed circuit board. A specific example of an off-board high-speed communication between chips is described in U.S. patent application Ser. No. 09/215,942, filed on Dec. 18, 1998, now U.S. Pat. No. 6,347,395, incorporated herein by reference. While the present invention is not necessarily limited to such applications, an appreciation of various aspects of the invention is best gained through a discussion of examples in such an environment.

According to one example embodiment of the present invention, a parallel data communication arrangement passes digital data on a parallel data bus between a pair of circuit modules, referred to a sending (or first) module and a receiving (or second) module. Digital data is sent from the first module to the second module over a parallel bus that has parallel bus lines susceptible to skewing data carried by the bus. The communication arrangement is designed so that the first and second modules communicate data concurrently over the parallel bus lines in a plurality of groups. Each of the groups includes a plurality of data-carrying lines and a clock path adapted to carry a clock signal for synchronizing the digital data carried from the first module to the second module. A data processing circuit arranges the sets of data so that they are presented for transmission over the bus in these data groups. Using the clock signal, the data is sent onto the parallel bus for reception by the second module.

The second module includes a receive circuit, which may be a register or a data buffer, a data processing circuit, and a FIFO buffer for each group. Initially, each FIFO buffer is cleared of any and all data. Using the clock signal for the group, within each group the received digital data is synchronously received at the receive circuit and then processed and passed into the FIFO buffer. The data groupings are defined so that, once the received data is in the FIFO buffer, any skew-caused misalignments do not exceed one half clock period. In this manner, the data and the clock signal have been resolved within a single clock period.

Skew-caused misalignments between the various groups, however, have not necessarily been resolved at this point. From the FIFO buffer, the data collected for each group is further processed, for example, using another FIFO buffer that is sufficiently wide to accept the data from multiple groups (in some applications, all of the groups) for alignment and overcoming any skew at this point in the receive stage. Thus, while skew-caused misalignments before this point are not necessarily resolved, the larger FIFO buffer can be used to resolve inter-group misalignments exceeding one half clock periods. Depending on the backend-alignment effort, in many implementations the larger FIFO buffer can be used to resolve inter-group misalignments of multiple clock periods. In one embodiment, as soon as each of the smaller FIFO buffers has validated stored data, the stored data is output to the larger FIFO buffer.

Such backend alignment can include use of various error-decoding techniques including, for example, distinguishing valid multiple-bit data values from invalid multiple-bit data values. Other approaches are described in the above-reference patent document entitled "Parallel Data Communication Having Multiple Sync Codes" Ser. No. 09/871,117.

In an alternative embodiment for the second module, a similar approach uses additional FIFO buffers (initial FIFOs) as part of the receive circuit for each group and before the data is sent into the first-mentioned FIFO buffer for each group. In this manner, the data processing circuit has the option of using the initial FIFO to assist in the realignment of any skewed data so that any skew-caused misalignments can exceed one half clock period, with the data and the clock signal being resolved beyond a single clock period for each data group. Once the data is passed to the next FIFO for each group ("the first-mentioned FIFO buffer"), processing continues as discussed above.

In another example embodiment of the present invention, a data-valid indicator (e.g., indicating whether received data is valid) is transmitted and used to control the reception of the data in each group. In one implementation, the data-valid indicator is transmitted for each group of transmitted data. In another implementation, the data-valid indicator is a unique coded-data value. In still another implementation, at least one special bit is transmitted for each group, and the data-valid indicator is transmitted using the at least one special bit.

FIG. 1 illustrates a parallel-data communication line arrangement 100, according to another example embodiment of the present invention. The arrangement 100 includes a differential clock that is used to define the rate at which the data is synchronously passed between from a processing circuit, such as CPU 102 and registers 106, at sending module 112 to a receiving module 114. The skilled artisan will appreciate that a differential clock is not required for all applications, and that although FIG. 1 illustrates the data being passed in only one direction, reciprocal communication can also be provided with each of the modules 112 and 114 being part of a respective communication node including the reciprocal set of transmit and receive circuits.

The arrangement 100 uses a data-value encoding-decoding approach in which data values are encoded by circuit 111 and then passed, from the sending module 112 to the receiving module 114, using parallel data lines 116 and 118 along with clock lines 122 that are used to provide the communication rate and synchronization timing between sending and receiving modules 112 and 114. At the receiving module 114, a processor or other decode circuit 130 uses a reciprocal coding algorithm, lookup table or equivalent circuit to decode the data value back to its unencoded data value.

The arrangement 112 is directed to an example application involving two clock domains, each domain defined by a clock signal for synchronizing communication for a 12-bit data clock (12 b DC) group corresponding to a pair of 6-bit code ("6 b") groups encoded as a pair of 8-bit code ("8 b") groups on bus lines 116 and 118. The first and second clock domains are respectively labeled using the same base base reference numeral with the second clock domain circuitry followed by an apostrophe; for example, the differential clock of the first clock domain is denoted 122 whereas the differential clock of the second clock domain is denoted 122'. The 12 b DC groups efficiently encode communications of data or commands of 12 signals. In some cases, it may be advantageous to use smaller groups. Thus, as illustrated, a 12 b DC group includes a differential clock pair and two 6 b8 b encodes, for a total of 18 pins between the sending module 112 and the receiving module 114. For each clock domain, one half of the 12 b DC group includes one 6 b8 b encoder and a differential clock pair, for a total of 10 pins. Un-encoded differential pairs can also be used to transport signals. These differential pairs can share the clock signal used with one half of a 12 b DC group, or the differential pairs can have their own clock pair.

Data in each of the 8 b code groups is synchronously received at the receiving module 114, where a data processing circuit, or in this instance an 8 b6 b decoder circuit 130, converts the synchronously received sets of 8-bit wide data into corresponding sets of 6-bit wide data values and then stores the 6-bit wide data values into a FIFO buffer 134 dedicated to the clock domain defined by the differential clock signal 122. Thus, for each clock domain there is one FIFO buffer immediately following a pair of 8 b6 b decoder circuits.

With the data groupings properly defined so that the data and the clock signal are resolved within a single clock period, the data in the FIFO buffer for each clock domain will not have any skew-caused misalignments. When FIFO 134 and FIFO 134' are not empty, a first piece of data from both are transferred to a larger FIFO 138, which is sufficiently wide to accept the data from both clock domains. A post-processor reads this data and removes any skew-caused misalignments between the various groups.

While it will be appreciated that the XbYb (e.g., 6 b8 b) encode is but one of many types of bit encodes, a number of different XbYb encoding approaches can be used, examples of which are provided using the 6 b8 b type of bit encode in the above-referenced patent document entitled "Parallel Communication Based On Balanced Data-Bit Encoding" (VLSI.295PA). This above-referenced patent document also illustrates and describes termination approaches useful in connection with the bus lines discussed herein.

Figures 1, 2, 3:
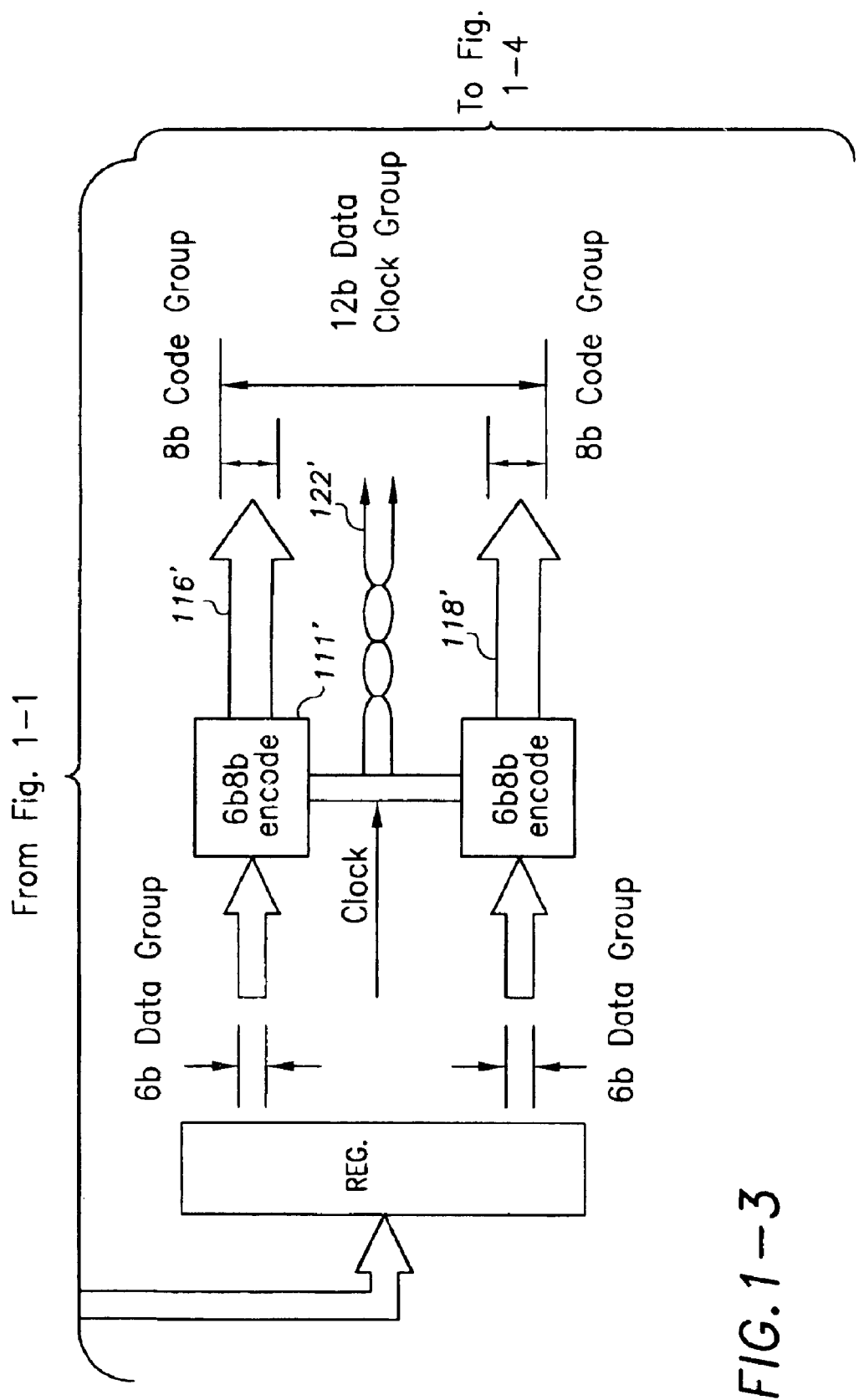
FIG. 2 is a diagram of another example parallel data communication line arrangement, also according to the present invention.
Figures 1, 2, 3, 4:
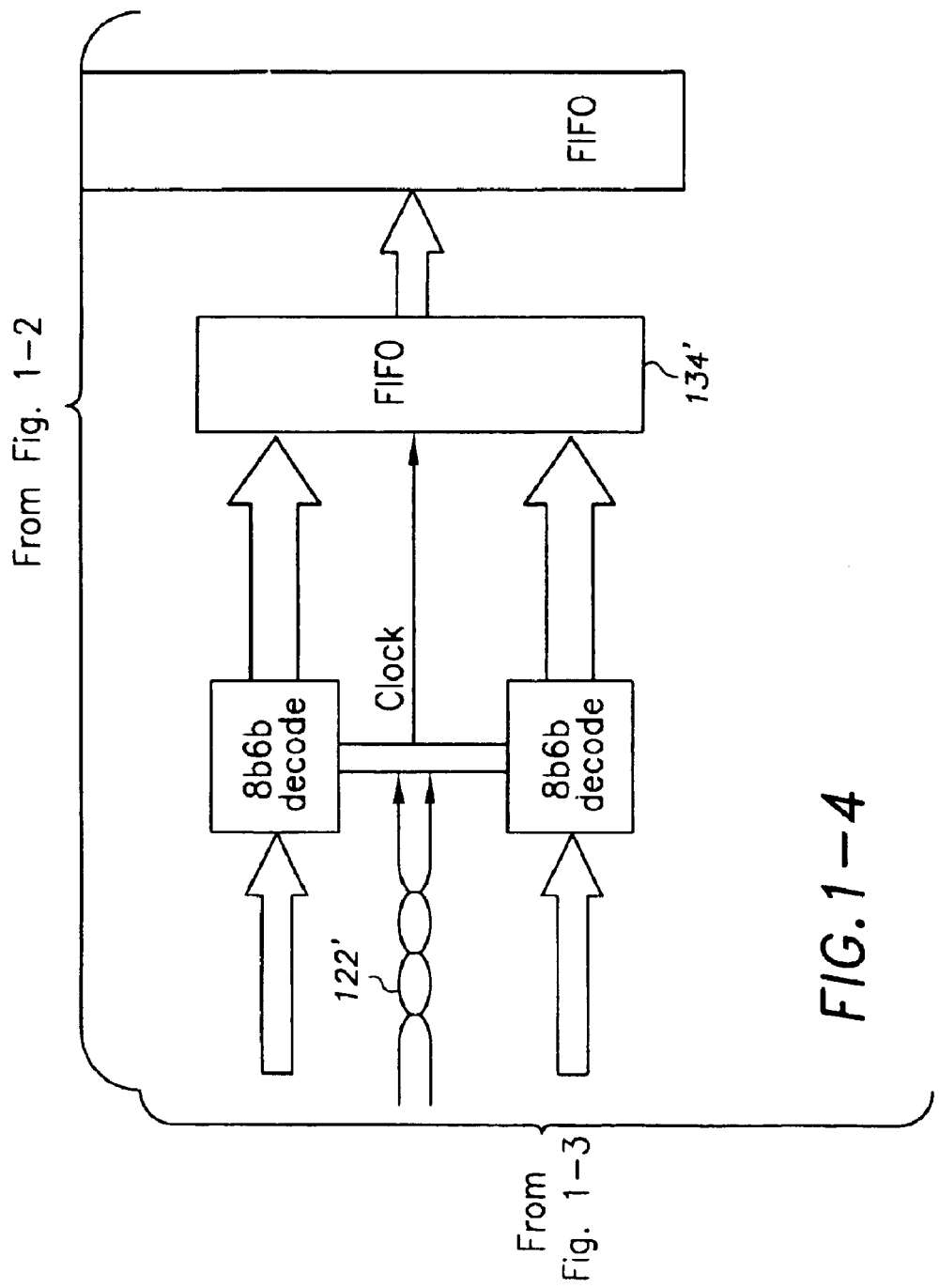
Figures 1, 2:
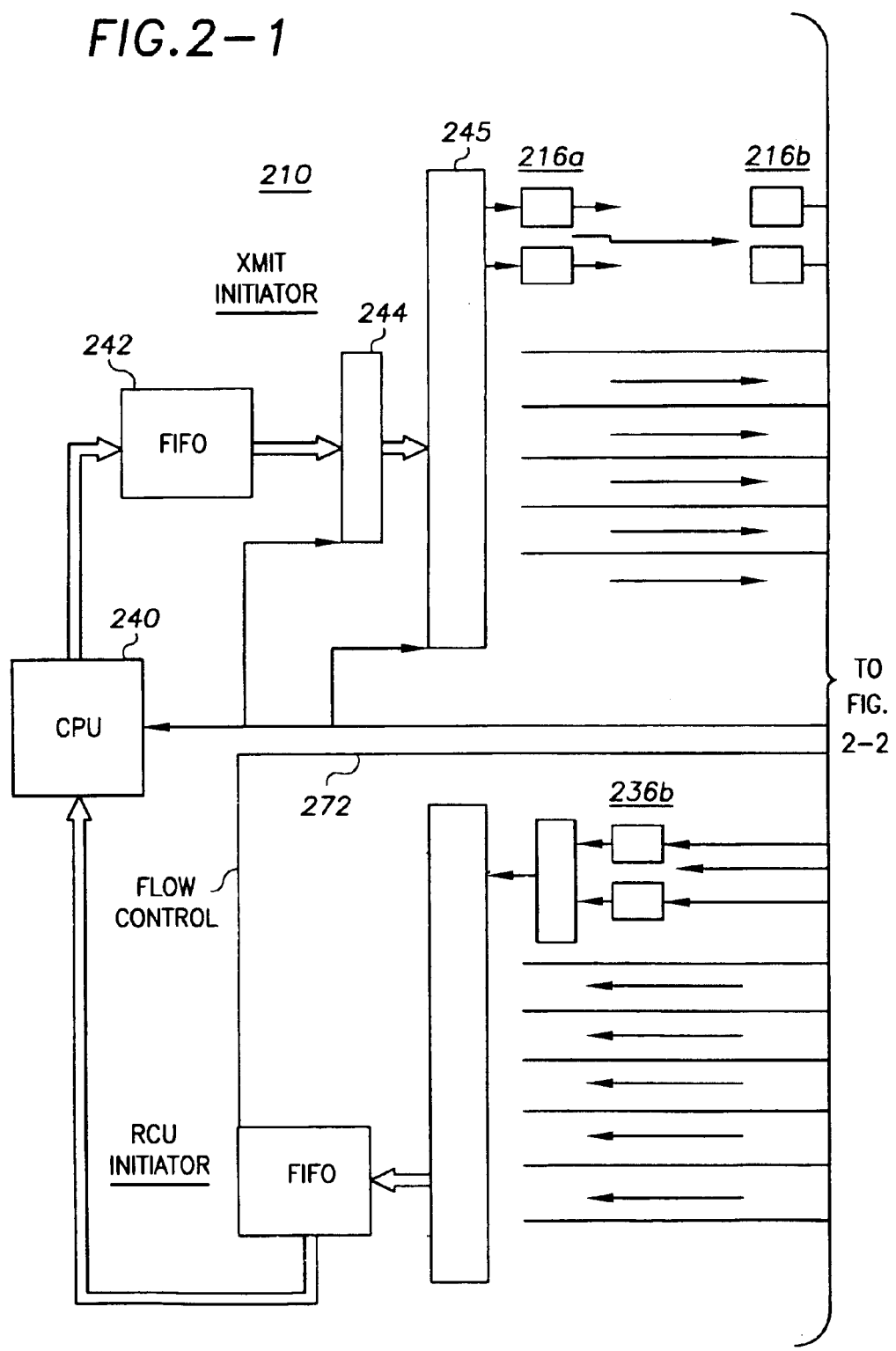

FIG. 2 illustrates another implementation of the present invention in which six of the same types of encode/decode clock domain circuits of FIG. 1 are used in each of two communication paths for communication in each respective direction. For passing communications initiated at a first terminal 210 for reception at the second terminal 212, one of the six identical clock domain circuits is depicted by connected circuits 216a and 216b. For communications initiated at the second terminal 212 for reception at the first terminal 210, six additional encode/decode clock domain circuits of this type are used; one of these circuits is depicted by connected circuits 236a and 236b. For the sake of brevity, the following discussion is limited to the communication flow initiated at the first terminal 210 for reception at the second terminal 212.

Communications initiated at a first terminal 210 begin at CPU 240, or another source, which feeds target data, along with any desired status or control data, to a front-end FIFO 242. From the FIFO 242, the data is formatted for communication at flow-control buffer 244 for presentation to the six sets of encode/decode clock domain circuits(depicted as 245); thus, the encode/decode clock domain circuits receive data that is 72 bits wide (twelve bits for each of the six domain circuits). After 6 b8 b encoding, the data is transmitted to and decoded at the second terminal 212 as previously described. Once decoded, the data is presented to the wide FIFO 246 and, with skew-caused misalignments being corrected, then packed into a FIFO 250 for processing by the second terminal CPU 260.

Also illustrated in FIG. 2 are flow-control communication paths 270 and 272. These paths 270 and 272 are used to provide status information back to the initiating terminal 210 or 212. Various types of communication status information can be provided depending on the application; examples include whether the FIFO is filled less than a lower threshold level, whether the FIFO is filled more than an upper threshold level, whether the FIFO is empty, whether the FIFO is full, whether an error has occurred due, for example, to the FIFO overflowing or invalid data being drawn from the FIFO. Such flow control is conventional and used in many communication schemes.

The skilled artisan will further recognize that the flow-control communication paths 270 and 272 can be implemented using any of a variety of different types of connections, including slower-speed connections such as single-ended, non-clocked signaling.

For the arrangement of FIG. 2, the timing relationship between the codes transmitted over the parallel bus and the differential clock is based on source synchronous timing, with register-to-register transfers used to simplify the timing process. For flow control, it is also advantageous to specify skew for data recovery, packet synchronization and maximum flight time.

In a communications channel (e.g., between transmitting and receiving terminals), code strobes are centered in the code window, which allows the data to be clocked in by using both edges of the clock. A single TC differential clock pair provides a rise and a fall per clock period. However, these signals are not used to clock the data until they have passed a differential receiver.

For the arrangement of FIG. 2, the timing at the receiving pins of a chip can be referenced at the intersection of the two strobes. The code is not sampled by using both code strobes (thereby providing a rising edge for each code window); rather, in this example, the code strobes are received by a differential receiver and the required clocks are generated from the single differential reference.

Accordingly, various embodiments have been described as example implementations of the present invention for addressing skew issues in parallel bus applications. In each such implementation, skew across clock-domain groups is tolerated and overcome by processing the data and the skew first within each clock domain group, and then between groups.

The present invention should not be considered limited to the particular examples described above. Various modifications, equivalent processes, as well as numerous structures to which the present invention may be applicable fall within the scope of the present invention. For example, multi-chip or single-chip arrangements can be implemented using a similarly constructed one-way or two-way interface for communication between the chip-set arrangements. Such variations may be considered as part of the claimed invention, as fairly set forth in the appended claims.

What is claimed is:

1. A method of parallel data communication arrangement that is susceptible to skewing data which is concurrently transmitted in a plurality of multiple-bit groups, comprising:
   receiving the concurrently-transmitted data in the plurality of multiple-bit groups; and
   after receiving the concurrently-transmitted data, realigning skew-caused misalignments between the groups;
   wherein realigning skew-caused misalignments between the groups occurs after validating the received data and before further interpretation of the received data.

2. The method of claim 1, further including controlling the skewing of the data in each group.

3. The method of claim 2, wherein controlling the skewing of the data in each group occurs independent of each other group.

4. The method of claim 1, further including transmitting, for each group, a clock signal used to synchronize the concurrently-transmitted data within each group.

5. The method of claim 1, further including transmitting a data-valid indicator and using the data-valid indicator to control the reception of the data in each group.

6. The method of claim 5, wherein transmitting the data-valid indicator is performed for each group of transmitted data.

7. The method of claim 6, further including coding the data into coded-data values before the data is concurrently transmitted in the plurality of multiple-bit groups and wherein the data-valid indicator is a unique coded-data value.

8. The method of claim 6, further including transmitting at least one special bit for each group, and wherein the data-valid indicator is transmitted using the at least one special bit.

9. The method of claim 1, for each group further including: transmitting a synchronization clock signal and a data-valid indicator, receiving the transmitted data by sampling the data at the synchronization clock signal, and using the data-valid indicator to control the reception of the data in the group.

10. The method of claim 9, for each group further including: determining that the data-valid indicator indicates that valid data has been received and, in response, storing the received data before realigning skew-caused misalignments between the groups.

11. The method of claim 9, wherein storing the received data for each group includes storing the received data in a single-group FIFO buffer dedicated to the group, and wherein realigning skew-caused misalignments between the groups includes providing a group-global FIFO for storing data output from the respective single-group FIFOs.

12. The method of claim 1, wherein for each group, data is carried by a plurality of data-carrying lines that are synchronized by a differential clock signal to tolerate any skew-caused misalignments between data concurrently transferred in the group, the skew-caused misalignments not exceeding one half clock period.

13. The method of claim 1, further including coding the data from an 8-bit value to a 6-bit coded-data value for each group before the data is concurrently transmitted.

14. A parallel data communication arrangement that is susceptible to skewing data which is concurrently transmitted in a plurality of multiple-bit groups, comprising:
    a receive circuit configured and arranged to receive the concurrently transmitted data in the plurality of multiple-bit groups;
    a realignment circuit configured and arranged to realign skew-caused misalignments between the groups after receiving the concurrently-transmitted data; and
    a sending module configured and arranged to concurrently transmit the data in the plurality of multiple-bit groups;
    wherein realigning skew-caused misalignments between the groups occurs after validating the received data and before further interpretation of the received data.

15. The parallel data communication arrangement of claim 14, further including controlling the skewing of the data in each group.

16. The parallel data communication arrangement of claim 15, wherein controlling the skewing of the data in each group occurs independent of each other group.

17. The parallel data communication arrangement of claim 14, further including transmitting, for each group, a clock signal used to synchronize the concurrently-transmitted data within each group.

18. The parallel data communication arrangement of claim 14, further including transmitting a data-valid indicator and using the data-valid indicator to control the reception of the data in each group.

19. The parallel data communication arrangement of claim 18, wherein transmitting the data-valid indicator is performed for each group of transmitted data.

20. The parallel data communication arrangement of claim 19, further including coding the data into coded-data values before the data is concurrently transmitted in the plurality of multiple-bit groups and wherein the data-valid indicator is a unique coded-data value.

21. The parallel data communication arrangement of claim 19, further including transmitting at least one special bit for each group, and wherein the data-valid indicator is transmitted using the at least one special bit.

22. The parallel data communication arrangement of claim 14, for each group further including: transmitting a synchronization clock signal and a data-valid indicator, receiving the transmitted data by sampling the data at the synchronization clock signal, and using the data-valid indicator to control the reception of the data in the group.

23. The parallel data communication arrangement of claim 22, for each group further including: determining that the data-valid indicator indicates that valid data has been received and, in response, storing the received data before realigning skew-caused misalignments between the groups.

24. The parallel data communication arrangement of claim 22, wherein storing the received data for each group includes storing the received data in a single-group FIFO buffer dedicated to the group, and wherein realigning skew-caused misalignments between the groups includes providing a group-global FIFO for storing data output from the respective single-group FIFOs.

25. The parallel data communication arrangement of claim 14, wherein for each group, data is carried by a plurality of data-carrying lines that are synchronized by a differential clock signal to tolerate any skew-caused misalignments between data concurrently transferred in the group, the skew-caused misalignments not exceeding one half clock period.

26. The parallel data communication arrangement of claim 14, further including coding the data from an 8-bit value to a 6-bit coded-data value for each group before the data is concurrently transmitted.

27. A method of parallel data communication arrangement that is susceptible to skewing data which is concurrently transmitted in a plurality of multiple-bit groups, comprising:

in each of the plurality of multiple-bit groups concurrently transmitting the data along with a synchronization clock signal and a data-valid indicator;

receiving the concurrently-transmitted data by sampling the data at the synchronization clock signal;

using the data-valid indicator to control the reception of the data in the group; and after using the data-valid indicator to control the reception of the data in the group, realigning skew-caused misalignments between the groups.

28. A parallel data communication arrangement that is susceptible to skewing data which is concurrently transmitted in a plurality of multiple-bit groups, comprising:

means for each of the plurality of multiple-bit groups, for concurrently transmitting the data along with a synchronization clock signal and a data-valid indicator;

means for receiving the concurrently-transmitted data by sampling the data at the synchronization clock signal;

means for using the data-valid indicator to control the reception of the data in the group; and after using the data-valid indicator to control the reception of the data in the group, means for realigning skew-caused misalignments between the groups means.

29. A parallel data communication arrangement that is susceptible to skewing data which is concurrently transmitted in a plurality of multiple-bit groups, comprising:

a first module having a transmission circuit for each of the plurality of multiple-bit groups, each transmission circuit for concurrently transmitting the data along with a synchronization clock signal and a data-valid indicator, a second module for, each group, receiving the concurrently-transmitted data by sampling the data at the synchronization clock signal, for using the data-valid indicator to control the reception of the data in the group, and after using the data-valid indicator to control the reception of the data in the group, for realigning skew-caused misalignments between the groups.

30. A method of parallel data communication arrangement that is susceptible to skewing data which is concurrently transmitted in a plurality of multiple-bit groups, comprising:

in each of the plurality of multiple-bit groups, concurrently transmitting the data along with a synchronization clock signal and a data-valid indicator;

in each of the plurality of multiple-bit groups,
receiving the concurrently-transmitted data by sampling the data at the synchronization clock signal,
using the data-valid indicator to control the reception of the data in the group, and
after using the data-valid indicator to control the reception of the data in the group, storing the received data in a single-group FIFO buffer; and realigning skew-caused misalignments between the groups including using a group-global FIFO buffer for storing data output from the respective single-group buffers and then interpreting the data in the group-global FIFO buffer.

31. A parallel data communication arrangement that is susceptible to skewing data which is concurrntly transmitted in a plurality of multiple-bit groups, comprising:

means, in each of the plurality of multiple-bit groups, for concurrently transmitting the data along with a synchronization clock signal and a data-valid indicator;

means, in each of the plurality of multiple-bit groups, for receiving the concurrently-transmitted data by sampling the data at the synchronization clock signal,
using the data-valid indicator to control the reception of the data in the group, and
after using the data-valid indicator to control the reception of the data in the group, storing the received data in a single-group FIFO buffer; and means for realigning skew-caused misalignments between the groups including using a group-global FIFO buffer for storing data output from the respective single-group buffers and then interpreting the data in the group-global FIFO buffer.

* * * * *